(12) United States Patent
Colwell et al.

(10) Patent No.: US 9,361,270 B2
(45) Date of Patent: Jun. 7, 2016

(54) DYNAMIC CONTROL OF AN INDUSTRIAL MACHINE

(71) Applicant: Harnischfeger Technologies, Inc., Wilmington, DE (US)

(72) Inventors: Joseph Colwell, Hubertus, WI (US); Mooyoung Lee, Milwaukee, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 0 days.

(21) Appl. No.: 13/688,699

(22) Filed: Nov. 29, 2012

(65) Prior Publication Data

US 2013/0138305 A1 May 30, 2013

Related U.S. Application Data

(60) Provisional application No. 61/564,677, filed on Nov. 29, 2011.

(51) Int. Cl.
*G06F 17/00* (2006.01)
*E02F 3/46* (2006.01)
*E02F 9/20* (2006.01)
*E02F 9/26* (2006.01)

(52) U.S. Cl.
CPC . *G06F 17/00* (2013.01); *E02F 3/46* (2013.01); *E02F 9/2095* (2013.01); *E02F 9/268* (2013.01)

(58) Field of Classification Search
CPC ............ E02F 3/43; E02F 9/20; E02F 9/2095; E02F 9/268; E02F 3/46; B66D 2700/025; G06F 17/00
USPC ..................................... 701/50; 414/685, 694
See application file for complete search history.

(56) References Cited

U.S. PATENT DOCUMENTS

| | | | |
|---|---|---|---|
| 2,440,319 A * | 4/1948 | Wickerham | .................... 318/261 |
| 3,867,678 A * | 2/1975 | Stoner | ..................... H02P 7/343 |
| | | | 318/432 |
| 3,934,126 A | 1/1976 | Zalesov et al. | |
| 4,339,225 A | 7/1982 | Donnally et al. | |
| 4,370,713 A | 1/1983 | McCoy, Jr. et al. | |
| 5,039,028 A * | 8/1991 | Svedlund et al. | ............. 254/275 |

(Continued)

FOREIGN PATENT DOCUMENTS

JP H09-279633 10/1997

OTHER PUBLICATIONS

Australian Patent Office Action for Application No. 2012258455 dated Apr. 9, 2014 (5 pages).

(Continued)

*Primary Examiner* — John Q Nguyen
*Assistant Examiner* — Nadeem Odeh
(74) *Attorney, Agent, or Firm* — Michael Best & Friedrich LLP

(57) ABSTRACT

A method of controlling a digging operation of an industrial machine. The industrial machine includes a dipper, a hoist rope attached to the dipper, a hoist motor moving the hoist rope and the dipper, and a computer having a controller. The method includes monitoring a speed of the hoist motor, determining an acceleration rate of the hoist motor, comparing the acceleration rate of the hoist motor to a threshold reverse factor, determining an impact situation when the acceleration rate is less than the threshold reverse factor, and sending a reverse torque control command signal to the hoist motor.

23 Claims, 8 Drawing Sheets

(56) References Cited

U.S. PATENT DOCUMENTS

| | | | |
|---|---|---|---|
| 5,408,767 A | 4/1995 | Hazama et al. | |
| 5,682,312 A | 10/1997 | Rocke | |
| 6,039,193 A | 3/2000 | Naud et al. | |
| 6,225,574 B1 | 5/2001 | Chang et al. | |
| 6,466,850 B1 | 10/2002 | Hilgart | |
| 6,480,773 B1 | 11/2002 | Hilgart | |
| 6,518,519 B1 | 2/2003 | Crane, III et al. | |
| 6,588,126 B2 | 7/2003 | Leslie et al. | |
| 6,934,616 B2 | 8/2005 | Colburn et al. | |
| 7,174,826 B2 | 2/2007 | Kerrigan et al. | |
| 7,472,009 B2 | 12/2008 | Baldwin | |
| RE40,869 E | 8/2009 | Leslie et al. | |
| 2005/0034902 A1* | 2/2005 | Madhavarao et al. | 177/136 |
| 2007/0266601 A1 | 11/2007 | Claxton | |
| 2009/0187527 A1 | 7/2009 | Mcaree et al. | |
| 2010/0010714 A1 | 1/2010 | Claxton | |
| 2011/0006023 A1 | 1/2011 | Schneider et al. | |
| 2011/0006024 A1 | 1/2011 | Schneider et al. | |
| 2011/0078929 A1* | 4/2011 | Hartwick et al. | 37/195 |
| 2011/0106384 A1 | 5/2011 | Corke et al. | |

OTHER PUBLICATIONS

Chilean Patent Office Action for Application No. 2012-003338 dated Mar. 10, 2015 (8 pages—Including English translation).
Office Action from the Chilean Patent Office for Application No. 3338-2012 dated Sep. 4, 2015 (8 pages).
First Office Action from the State Intellectual Property Office of China for Application No. 201210599075.7 dated Dec. 3, 2015 (19 pages).

* cited by examiner

DYNAMIC CONTROL OF AN INDUSTRIAL MACHINE

CROSS-REFERENCE TO RELATED APPLICATIONS

This application claims priority to U.S. Provisional Application No. 61/564,677, filed on Nov. 29, 2011, which is incorporated herein by reference in its entirety.

BACKGROUND

This invention relates to controlling a digging operation of an industrial machine, such as an electric rope or power shovel.

SUMMARY

Industrial machines, such as electric rope or power shovels, draglines, etc., are used to execute digging operations to remove material from, for example, a bank of a mine. These machines and/or their components are generally driven by electric motor(s). In some situations during the operations of a power shovel with a dipper (e.g., when a shovel's dipper hits a hard object in the bank), an impact loading is created due to the sudden speed reduction in one of the motor(s) of the machine (e.g., the hoist motor). When loads are applied suddenly and when the loads are applied as impact loads the resulting stresses induced in the machine elements is much higher than if the loads are applied gradually. Therefore, the stress in the hoist system, the hoist attachment, and the overall machine structure is increased due to the impact loading. This can cause weld cracking and other strains on the entire industrial machine. Limiting the impact loading of the industrial machine can therefore increase the operational life of the machine.

When a dipper of a power shovel hits a hard object while hoisting through the bank, the object forces the dipper to come to an immediate stop. The result is a sudden speed reduction in the hoist motor (e.g., armature, coupling, and brake/hub) and the transmission components (e.g., pinions and gears). The hoist rope(s) of the shovel begins stretching and the hoist motor starts decelerating due to the applied load from the object. At that point, the majority of the inertia of the entire machine is concentrated in the hoist motor that moves the dipper. Due to this inertia, when the hoist motor starts having a large negative acceleration (i.e., deceleration) based on the applied load, this creates a an additional torque that effectively places additional impact load on the hoist motor and on the machine's structures (e.g., in some cases impact loading is between 150%-225% of the stall motor torque). At the same time, the hoist motor applies its maximum programmed torque to compensate for the reduction in speed. All this energy and torque applied from the hoist motor transfers to the gearing, hoist rope, dipper, material, the boom, and creates increased stresses throughout the entire machine.

Conventional shovels are generally designed to statically limit the impact loading based on known static bail pulls and expected "impact factors" that have been historically tested or used. Some existing methods for impact control of industrial machines include using slip clutches to limit the impact load. The described invention seeks to move away from these known principles and to control the impact loading dynamically. For that reason, the invention provides a control system and a method that dynamically compensates for the internal loading of the hoist motor of an industrial machine during sudden impact loading. The proposed method uses active monitoring of the hoist motor acceleration and actively compensates for the motor inertia during impact loading. That way, the system decreases the fatigue loading of all machine structures and components while also increases the nominal allowable bail pull or hoist force through the normal digging cycle.

In one embodiment, the invention provides a method of controlling a digging operation of an industrial machine. The industrial machine includes a dipper, a hoist rope attached to the dipper, a hoist motor moving the hoist rope and the dipper, and a computer having a controller. The method includes monitoring a speed of the hoist motor, determining an acceleration rate of the hoist motor, comparing the acceleration rate of the hoist motor to a threshold reverse factor, determining an impact situation when the acceleration rate is less than the threshold reverse factor, and sending a reverse torque control command signal to the hoist motor.

In another embodiment, the invention provides an industrial machine. The industrial machine includes a dipper, a hoist rope attached to the dipper, a hoist motor operable to move the hoist rope and the dipper, and a controller connected to the hoist motor. The controller is executing programmed instructions to monitor a speed of the hoist motor, determine an acceleration rate of the hoist motor, compare the acceleration of the hoist motor to a threshold reverse factor, determine an impact situation when the acceleration rate is less than the threshold reverse factor, and send a reverse torque control command signal to the hoist motor.

In yet another embodiment, the invention provides a method of controlling a digging operation of an industrial machine. The industrial machine includes a dipper, a hoist rope attached to the dipper, a hoist motor moving the hoist rope and the dipper, and a computer having a controller. The method includes determining an acceleration rate and a torque of the hoist motor, determining a bail pull of the hoist motor using the acceleration rate and a torque of the hoist motor, comparing the hoist motor bail pull to a hoist motor bail pull threshold, and determining an impact situation when the hoist motor bail pull is greater than the hoist motor bail pull threshold, and sending a reverse torque control command signal to the hoist motor.

In yet another embodiment, the invention provides a method of controlling a digging operation of an industrial machine. The industrial machine includes a dipper, a drag rope attached to the dipper, a drag motor moving the drag rope and the dipper, and a computer having a controller. The method includes monitoring a speed of the drag motor, determining an acceleration of the drag motor, comparing the acceleration of the drag motor to a threshold reverse factor, determining an impact situation when the acceleration rate is less than the threshold reverse factor, and sending a reverse torque control command signal to the drag motor.

Other aspects of the invention will become apparent by consideration of the detailed description and accompanying drawings.

DETAILED DESCRIPTION

Figure 1:
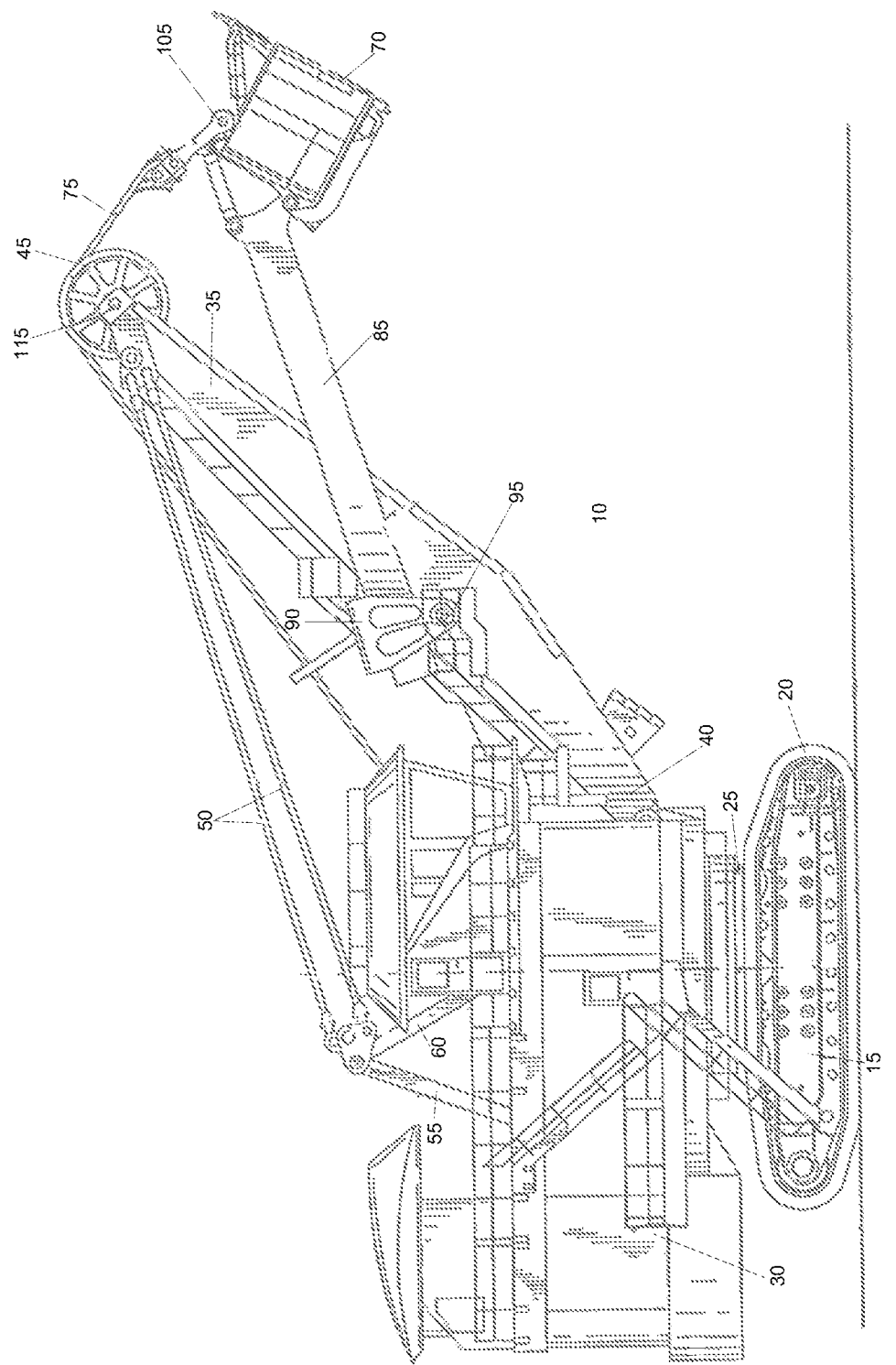
FIG. 1 illustrates an industrial machine according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components.

The invention described herein relates to systems, methods, devices, and computer readable media associated with the dynamic control of the hoist system of an industrial machine based on impact loading of the industrial machine. The industrial machine, such as an electric rope shovel or similar mining machine, is operable to execute a digging operation to remove a payload (i.e. material) from a bank. As the industrial machine is digging into the bank, the forces on the industrial machine caused by the impact of a dipper with a movable object in the bank (e.g., a large boulder) can produce an impact load that increases the torque of the hoist motor pulling the dipper. As a result of the impact loading, the industrial machine experiences structural fatigue and stresses that can adversely affect the operational life of the industrial machine.

In order to reduce impact loading that is experienced by the hoist system of the industrial machine, a controller of the industrial machine dynamically modifies the drive input signals of the hoist motor to reverse the hoist torque and thereby remove the kinetic energy stored in the hoist motor in order to limit the dynamic increase in the actual bail pull of the machine. Specifically, the controller dynamically increases a maximum allowable reverse or lowering torque (e.g., beyond a standard operational value) based on a determined acceleration of a component of the industrial machine (e.g., the hoist motor). Controlling the operation of the industrial machine in such a manner during a digging operation limits the damaging effects of impact loading that commonly occur during the operation of the industrial machine. In particular, this control method reduces the direct stress on the hoist rope, the hoist gear case, and other structural elements of the industrial machine. Further, the nominal loading on the machine can be increased since the damaging effects of the impact loading created by the hoist motor inertia can be controlled.

Although the invention described herein can be applied to, performed by, or used in conjunction with a variety of industrial machines (e.g., a rope shovel, a dragline with hoist and drag motions, hydraulic machines, etc.), embodiments of the invention described herein are described with respect to an electric rope or power shovel, such as the power shovel 10 shown in FIG. 1. The shovel 10 includes a mobile base 15, drive tracks 20, a turntable 25, a machinery deck 30, a boom 35, a lower boom end 40, a sheave 45, tension cables 50, a back stay 55 (also called a tension member), a gantry structure 60, a dipper 70, one or more hoist ropes 75, a winch drum 80 (not shown), dipper arm or handle 85, a saddle block 90, a pivot point 95, a transmission unit 100 (not shown), a bail pin 105, one or more inclinometers 110 (not shown), and a sheave pin 115. In the illustrated embodiment, the winch drum 80 and the transmission unit 100 are covered by a housing of the shovel 10.

The mobile base 15 is supported by the drive tracks 20. The mobile base 15 supports the turntable 25 and the machinery deck 30. The turntable 25 is capable of 360-degrees of rotation about the machinery deck 30 relative to the mobile base 15. The boom 35 is pivotally connected at the lower end 40 to the machinery deck 30. The boom 35 is held in an upwardly and outwardly extending position relative to the deck by the tension cables 50 which are anchored to the back stay 55 of the gantry structure 60. The gantry structure 60 is rigidly mounted on the machinery deck 30, and the sheave 45 is rotatably mounted on the upper end of the boom 35.

The dipper 70 is suspended from the boom 35 by the hoist rope(s) 75. The hoist rope 75 is wrapped over the sheave 45 and attached to the dipper 70 at the bail pin 105. The hoist rope 75 is anchored to the winch drum 80 of the machinery deck 30. As noted above, in the illustrated embodiment, the winch drum 80 is covered by a hosing of the shovel 10. The winch drum 80 is driven by at least one an electric motor 82 (not shown) that incorporates a transmission unit (also covered by the housing of the shovel and not shown). As the winch drum 80 rotates, the hoist rope 75 is paid out to lower the dipper 70 or pulled in to raise the dipper 70. The dipper handle 85 is also rigidly attached to the dipper 70. The dipper handle 85 is slidably supported in a saddle block 90, and the saddle block 90 is pivotally mounted to the boom 35 at the pivot point 95. The dipper handle 85 includes a rack tooth formation thereon which engages a drive pinion mounted in the saddle block 90. The drive pinion is driven by an electric motor and transmission unit 100 to extend or retract the dipper arm 85 relative to the saddle block 90.

An electrical power source (not shown) is mounted to the machinery deck 30 to provide power to the hoist electric motor 82 for driving the winch drum 80, one or more crowd electric motors for driving the saddle block transmission unit 100, and one or more swing electric motors for turning the turntable 25. Each of the crowd, hoist, and swing motors can be driven by its own motor controller or drive in response to control signals from a controller, as described below. When the industrial machine applicable to this invention is a dragline with hoist and drag motions, the electrical power source can provide power to a hoist electric and drag motors (not shown) for driving a drag rope attached to a dipper.

Figure 2:
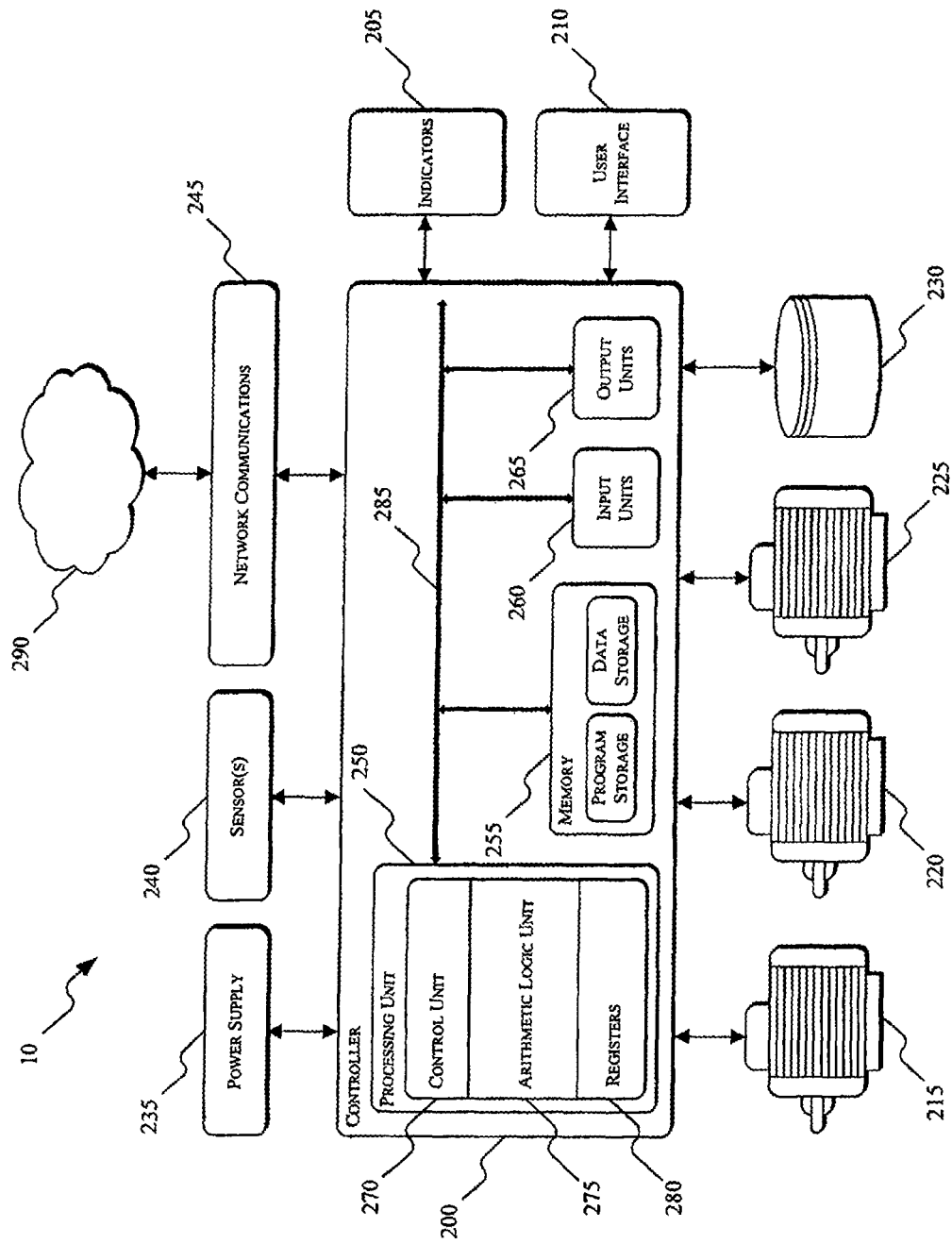
FIG. 2 illustrates a controller for an industrial machine according to an embodiment of the invention.

FIG. 2 illustrates a controller 200 associated with the power shovel 10 of FIG. 1. It is to be understood that the controller 200 can be used is a variety of industrial machines besides the shovel 10 (e.g., a dragline, hydraulic machines, construction machines, etc.). The controller 200 is in communication with a variety of modules or components of the shovel 10. For example, the illustrated controller 200 is connected to one or more indicators 205, a user interface module 210, one or more hoist motors and hoist motor drives 215, one or more crowd motors and crowd motor drives 220, one or more swing motors and swing motor drives 225, a data store or database 230, a power supply module 235, one or more sensors 240, and a network communications module 245. The controller 200 includes combinations of hardware and software that are operable to, among other things, control the operation of the power shovel 10, control the position of the boom 35, the dipper arm 85, the dipper 70, etc., activate the one or more indicators 205 (e.g., a liquid crystal display ["LCD"]), monitor the operation of the shovel 10, etc. The one or more sensors 240 include, among other things, position sensors, velocity sensors, speed sensors, acceleration sensors, the inclinometers 110, one or more motor field modules, etc. The velocity and acceleration sensors, for example, are configured to detect the velocity and the acceleration of the hoist motor 82 and to provide that information to the controller 200.

In some embodiments, the controller 200 includes a plurality of electrical and electronic components that provide power, operational control, and protection to the components and modules within the controller 200 and/or shovel 10. For example, the controller 200 includes, among other things, a processing unit 250 (e.g., a microprocessor, a microcontroller, or another suitable programmable device), a memory 255, input units 260, and output units 265. The processing unit 250 includes, among other things, a control unit 270, an arithmetic logic unit ("ALU") 275, and a plurality of registers 280 (shown as a group of registers in FIG. 2), and is implemented using a known computer architecture. The processing unit 250, the memory 255, the input units 260, and the output units 265, as well as the various modules connected to the controller 200 are connected by one or more control and/or data buses (e.g., common bus 285). The control and/or data buses are shown generally in FIG. 2 for illustrative purposes. The use of one or more control and/or data buses for the interconnection between and communication among the various modules and components would be known to a person skilled in the art in view of the invention described herein. In some embodiments, the controller 200 is implemented partially or entirely on a semiconductor (e.g., a field-programmable gate array ["FPGA"] semiconductor) chip, such as a chip developed through a register transfer level ("RTL") design process.

The memory 255 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 250 is connected to the memory 255 and executes software instructions that are capable of being stored in a RAM of the memory 255 (e.g., during execution), a ROM of the memory 255 (e.g., on a generally permanent basis), or another non-transitory computer readable medium such as another memory or a disc. Software included in the implementation of the shovel 10 can be stored in the memory 255 of the controller 200. The software includes, for example, firmware, one or more applications, program data, filters, rules, one or more program modules, and other executable instructions. The controller 200 is configured to retrieve from memory and execute, among other things, instructions related to the control processes and methods described herein. In other constructions, the controller 200 includes additional, fewer, or different components.

The network communications module 245 is configured to connect to and communicate through a network 290. In some embodiments, the network is, for example, a wide area network ("WAN") (e.g., a TCP/IP based network, a cellular network, such as, for example, a Global System for Mobile Communications ["GSM"] network, a General Packet Radio Service ["GPRS"] network, a Code Division Multiple Access ["CDMA"] network, an Evolution-Data Optimized ["EV-DO"] network, an Enhanced Data Rates for GSM Evolution ["EDGE"] network, a 3GSM network, a 4GSM network, a Digital Enhanced Cordless Telecommunications ["DECT"] network, a Digital AMPS ["IS-136/TDMA"] network, or an Integrated Digital Enhanced Network ["iDEN"] network, etc.).

In other embodiments, the network 290 is, for example, a local area network ("LAN"), a neighborhood area network ("NAN"), a home area network ("HAN"), or personal area network ("PAN") employing any of a variety of communications protocols, such as Wi-Fi, Bluetooth, ZigBee, etc. Communications through the network 290 by the network communications module 245 or the controller 200 can be protected using one or more encryption techniques, such as those techniques provided in the IEEE 802.1 standard for port-based network security, pre-shared key, Extensible Authentication Protocol ("EAP"), Wired Equivalency Privacy ("WEP"), Temporal Key Integrity Protocol ("TKIP"), Wi-Fi Protected Access ("WPA"), etc. The connections between the network communications module 245 and the network 290 are, for example, wired connections, wireless connections, or a combination of wireless and wired connections. Similarly, the connections between the controller 200 and the network 290 or the network communications module 245 are wired connections, wireless connections, or a combination of wireless and wired connections. In some embodiments, the controller 200 or network communications module 245 includes one or more communications ports (e.g., Ethernet, serial advanced technology attachment ["SATA"], universal serial bus ["USB"], integrated drive electronics ["IDE"], etc.) for transferring, receiving, or storing data associated with the shovel 10 or the operation of the shovel 10.

The power supply module 235 supplies a nominal AC or DC voltage to the controller 200 or other components or modules of the shovel 10. The power supply module 235 is powered by, for example, a power source having nominal line voltages between 100V and 240V AC and frequencies of approximately 50-60 Hz. The power supply module 235 is also configured to supply lower voltages to operate circuits and components within the controller 200 or shovel 10. In other constructions, the controller 200 or other components and modules within the shovel 10 are powered by one or more batteries or battery packs, or another grid-independent power source (e.g., a generator, a solar panel, etc.).

The user interface module 210 is used to control or monitor the power shovel 10. For example, the user interface module 210 is operably coupled to the controller 200 to control the position of the dipper 70, the position of the boom 35, the position of the dipper handle 85, the motor 82, etc. The user interface module 210 includes a combination of digital and analog input or output devices required to achieve a desired level of control and monitoring for the shovel 10. For example, the user interface module 210 includes a display (e.g., a primary display, a secondary display, etc.) and input devices such as touch-screen displays, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. The user interface module 210 can also be configured to display conditions or data associated with the power shovel 10 in real-time or substantially real-time. For example, the user interface module 210 is configured to display measured electrical characteristics of the power shovel 10, the status of the motor 82, the status of the power shovel 10, the position of the dipper 70, the position of the dipper handle 85, etc. In some implementations, the user interface module 210 is controlled in conjunction with the one or more indicators 205 (e.g., LEDs, speakers, etc.) to provide visual or auditory indications of the status or conditions of the power shovel 10.

Figure 3:
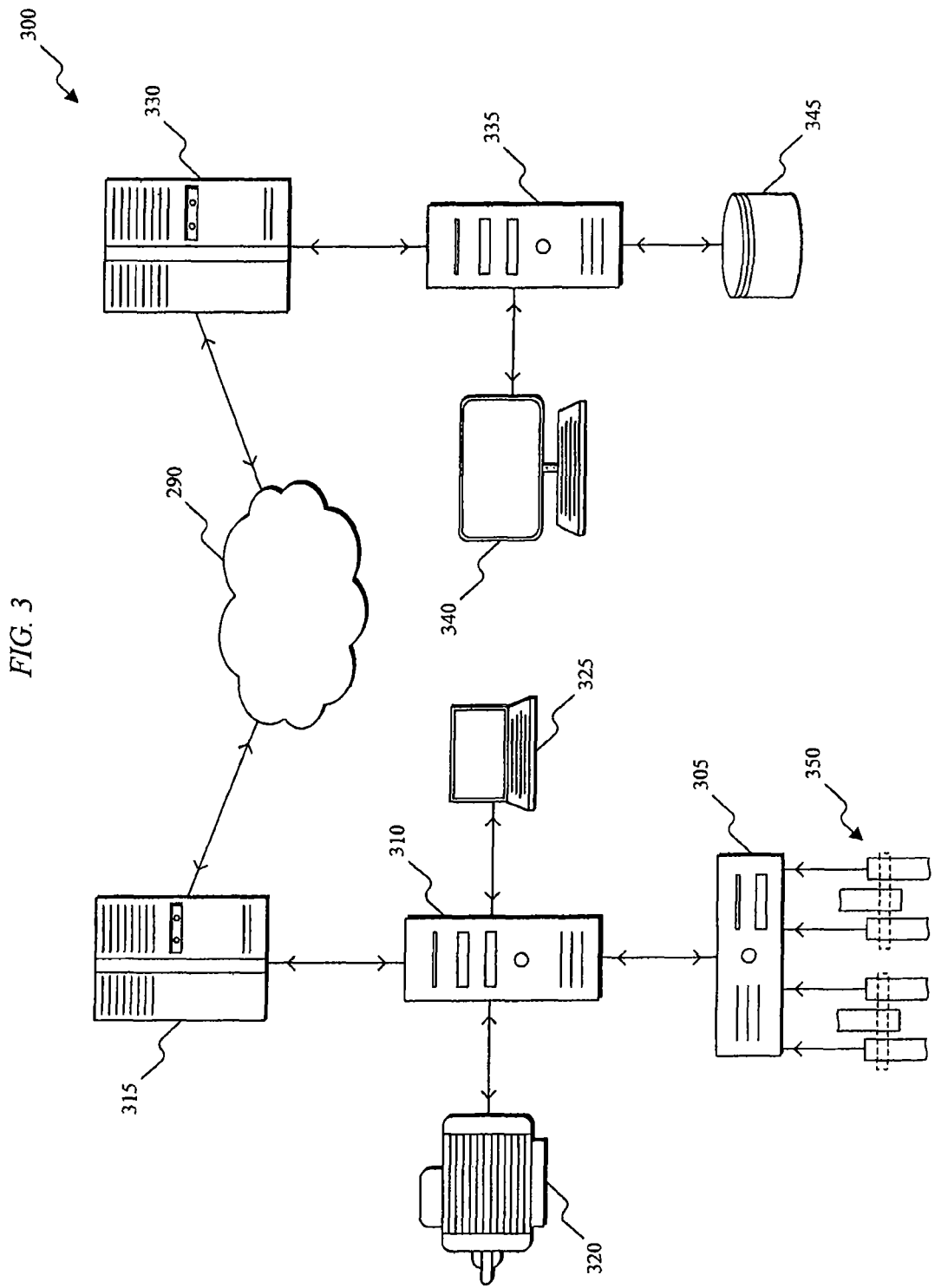
FIG. 3 illustrates a data logging system for an industrial machine according to an embodiment of the invention.

Information and data associated with the shovel 10 described above can also be stored, logged, processed, and analyzed to implement the control methods and processes described herein, or to monitor the operation and performance of the shovel 10 over time. For example, FIG. 3 illustrates a data logging and monitoring system 300 for the shovel 10. The system includes a data acquisition ("DAQ") module 305, a control device 310 (e.g., the controller 200), a data logger or recorder 315, a drive device 320, a first user interface 325, the network 290, a data center 330 (e.g., a relational database), a remote computer or server 335, a second user interface 340, and a reports database 345. The DAQ module 305 is configured to, for example, receive analog signals from one or more sensors 240 (e.g., velocity, speed, or acceleration sensors 350), convert the analog signals to digital signals, and pass the digital signals to the control device 310 for processing. The control device 310 also receives signals from the drive device 320. The drive device 320 in the illustrated embodiment is a motor and motor drive 320 (e.g., a hoist motor and/or drive, a crowd motor and/or drive, a swing motor and/or drive, etc.) that provides information to the control device 310 related to, among other things, motor RPM, motor current, motor voltage, motor power, etc. In other embodiments, the drive device 320 is one or more operator controls in an operator cab of the shovel 10 (e.g., a joystick). The control device 310 is configured to use the information and data provided by the DAQ module 305 and the drive device 320, as well as other sensors and monitoring devices associated with the operation of the shovel 10, to determine, for example, an impact situation of the shovel 10 (e.g., when the dipper hit a large object in the bank), power usage (e.g., tons/kilowatt-hour), tons of material moved per hour, cycle times, fill factors, payload, dipper handle angle, dipper position, etc. In some embodiments, the sensors and monitoring devices include an industrial machine monitoring and control system for gathering, processing, analyzing, and logging information and data associated with the shovel 10, such as the P&H® Centurion® system produced and sold by P&H Mining Equipment, Milwaukee, Wis.

The first user interface 325 can be used to monitor the information and data received by the control device 310 in real-time or access information stored in the data logger or recorder 315. The information gathered, calculated, and/or determined by the control device 310 is then provided to the data logger or recorder 315. The data logger or recorder 315, the control device 310, the drive device 320, and the DAQ module 305 are, in the illustrated embodiment, contained within the shovel 10. In other embodiments, one or more of these devices can be located remotely from the shovel 10. The impact situation of the shovel 10, power usage (e.g., tons/kilowatt-hour), tons of material moved per hour, cycle times, fill factors, etc., determined by the control device 310 can also be used by the control device 310 during the implementation of the control methods and processes described herein (e.g., controlling the digging operation).

The data logger or recorder 315 is configured to store the information from the control device 310 and provide the stored information to the remote datacenter 330 for further storage and processing. For example, the data logger or recorder 315 provides the stored information through the network 290 to the datacenter 330. The network 290 was described above with respect to FIG. 2. In other embodiments, the data from the data logger or recorder 315 can be manually transferred to the datacenter 330 using one or more portable storage devices (e.g., a universal serial bus ["USB"] flash drive, a secure digital ["SD"] card, etc.). The datacenter 330 stores the information and data received through the network 290 from the data logger or recorder 315. The information and data stored in the datacenter 330 can be accessed by the remote computer or server 335 for processing and analysis. For example, the remote computer or server 335 is configured to process and analyze the stored information and data by executing instructions associated with a numerical computing environment, such as MATLAB®. The processed and analyzed information and data can be compiled and output to the reports database 345 for storage. For example, the reports database 345 can store reports of the information and data from the datacenter 330 based on, among other criteria, hour, time of day, day, week, month, year, operation, location, component, work cycle, dig cycle, operator, mined material, bank conditions (e.g., hard toe), payload, etc. The reports stored in the reports database 345 can be used to determine the effects of certain shovel operations on the shovel 10, monitor the operational life and damage to the shovel 10, determine trends in productivity, etc. The second user interface 340 can be used to access the information and data stored in the datacenter 330, manipulate the information and data using the numerical computing environment, or access one or more reports stored in the reports database 345.

The processor 250 of the controller 200 is configured to send control signals to control hoisting, crowding, and swinging operations of the shovel 10. The control signals are associated with drive signals for hoist, crowd, and swing motors 215, 220, and 225 of the shovel 10. As the drive signals are applied to the motors 215, 220, and 225, the outputs (e.g., electrical and mechanical outputs) of the motors are monitored and fed back to the controller 200. The outputs of the motors include, for example, motor speed, motor torque, motor power, motor current, etc. Based on these and other signals associated with the shovel 10 (e.g., signals from the sensors 240), the controller 200 is configured to determine or calculate one or more operational states or positions of the shovel 10 or its components. In some embodiments, the controller 200 determines a hoist motor operational status, a hoist rope wrap angle, a hoist motor rotations per minute ("RPM"), a crowd motor RPM, a hoist motor acceleration/deceleration, etc.

The controller 200 and the control system of the shovel 10 described above are used to implement a dynamic hoist impact control ("DHIC") for the shovel 10. DHIC is used to dynamically control the application of hoist motor forces during impact loading to reduce structural fatigue on various components of the shovel 10 (e.g., the hoist motor 82, the hoist ropes 75, the mobile base 15, the turntable 25, the machinery deck 30, the lower end 40, etc.). For example, DHIC is configured to dynamically modify an allowable hoist reverse torque (i.e., a generating torque) to reduce hoist motor speed based on a determined acceleration of the hoist motor 82 when the dipper 70 impacts a bank and the shovel 10 experiences impact loading.

Figure 4:
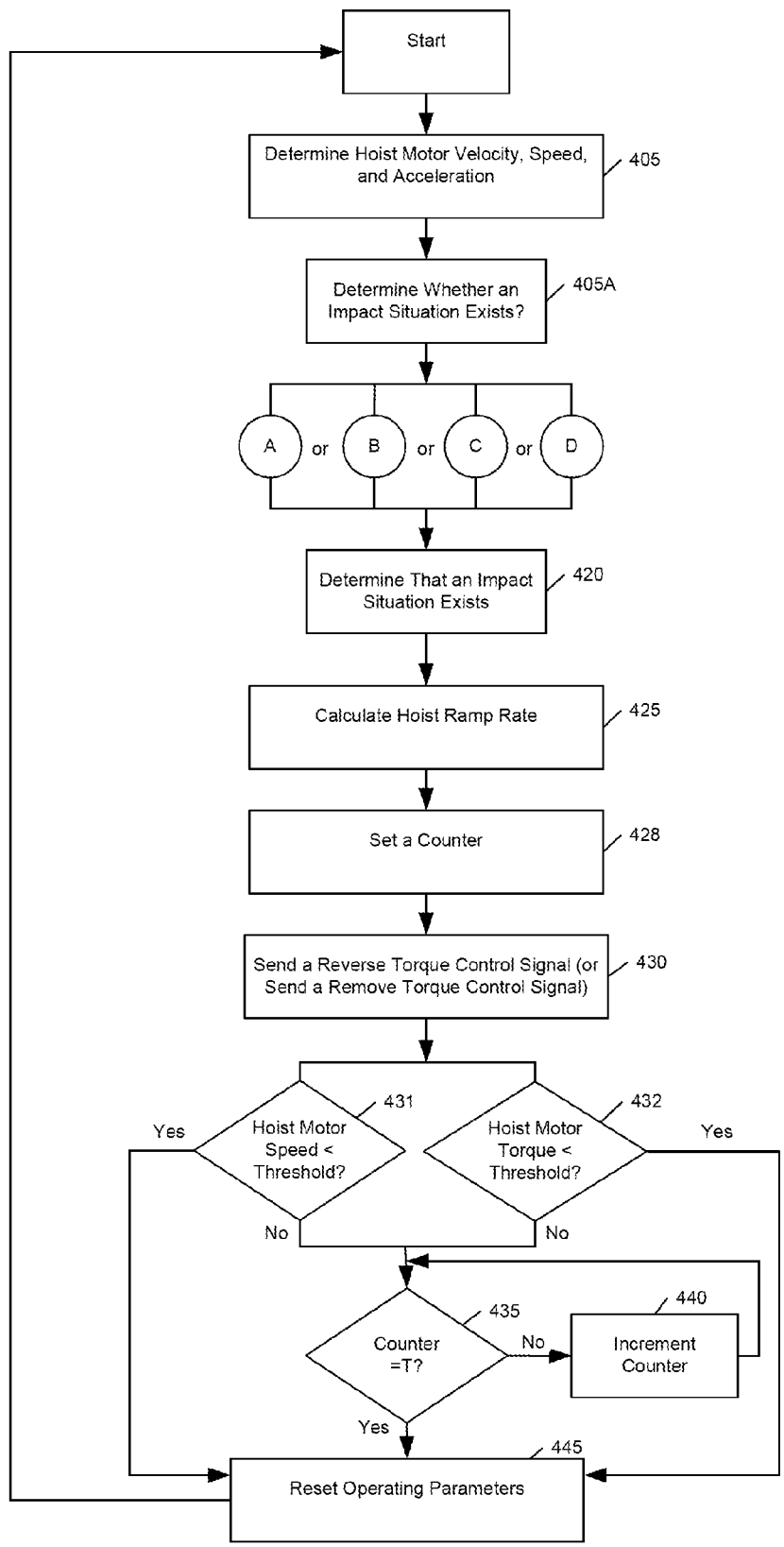
FIGS. 4-8 illustrate a process for controlling an industrial machine according to an embodiment of the invention.

An implementation of DHIC for the shovel 10 is illustrated with respect to the process 400 of FIG. 4. The process 400 is associated with and described herein with respect to a digging operation and hoist and impact loading forces applied during the digging operation. The process 400 is illustrative of an embodiment of DHIC and can be executed by the controller 200. Various steps described herein with respect to the process 400 are capable of being executed simultaneously, in parallel, or in an order that differs from the illustrated serial manner of execution. The process 400 is also capable of being executed using additional or fewer steps than are shown in the illustrated embodiment. Additionally, in some embodiments, values such as threshold reverse factor ("TRF") (see step 415) have fixed or stored values. The steps of the process 400 relate to, for example, determining a hoist motor torque, determining a hoist motor speed, determining a hoist acceleration, etc., are accomplished using the one or more sensors 240 that can be processed and analyzed using instructions executed by the controller 200 to determine a value for the characteristic of the shovel 10.

As shown in FIG. 4, the process 400 for DHIC begins with determining a hoist motor torque, speed (e.g., in RPM), and acceleration for the one or more hoist motors 215 (e.g., the motor 82) (at step 405). The level of hoist motor torque and speed are determined, for example, based on one or more characteristics of the one or more hoist motors 215. The characteristics of the one or more hoist motors 215 can include a motor voltage, a motor current, a motor power, a motor power factor, etc. Next, the process 400 continues with determining whether an impact situation exists (i.e., that a dynamic hoist even has occurred) at step 405A. There are several different techniques (i.e., steps A-D) that can be used by the controller 200 to determine whether an impact situation exists. The controller can use any of the described techniques individually or in combination. These techniques are illustrated in FIGS. 5-8.

Figure 5:
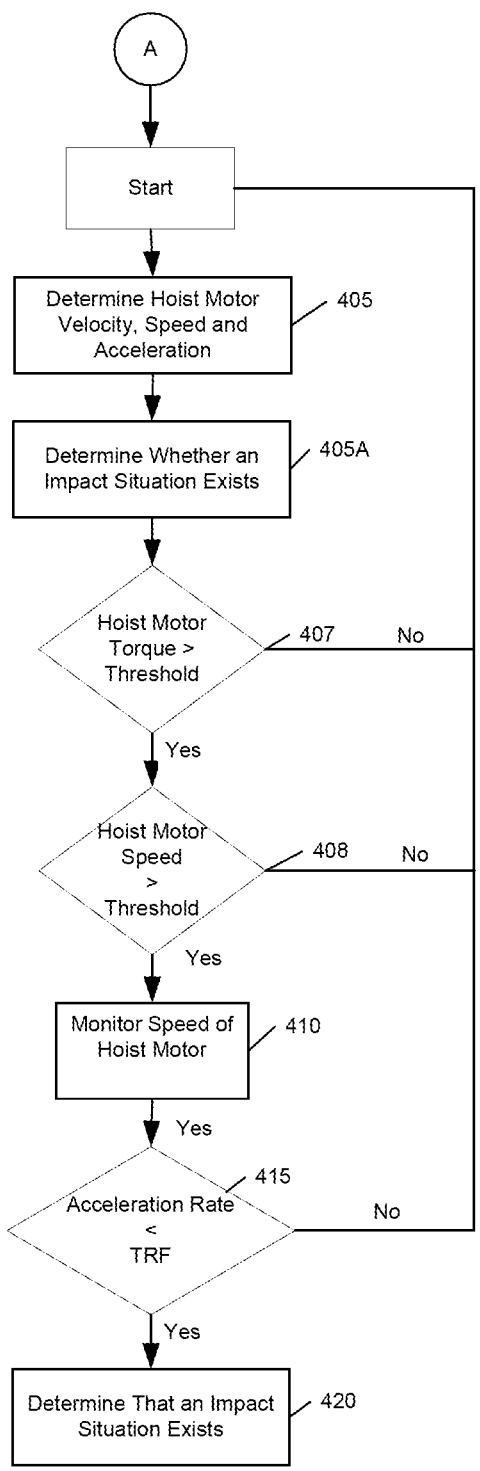

FIG. 5 illustrates a first technique for determining whether an impact situation exists. If the hoist motor torque and motor speed are less than corresponding predetermined hoist motor torque and motor speed values (at steps 407 and 408), the process 400 determines that the shovel 10 is not currently digging in the bank and returns to its starting point. If, on the other hand, the hoist motor torque and motor speed are greater than the hoist motor torque and the hoist motor speed predetermined values, the process proceeds to step 410.

At step 410, the process 400 monitors the velocity and/or the speed of the hoist motor 82. For example, the controller 200 receives information from the sensors 240 (e.g., velocity sensors, speed sensors, accelerating sensors, etc.) and processes the information to monitor the velocity and/or the speed of the hoist motor 82. In one embodiment, the processor 250 constantly determines the acceleration/deceleration rate of the hoist motor 82. If the controller 200 determines the hoist motor torque is greater than a threshold hoist motor torque and a minimum hoist motor speed is present, the controller 200 determines that the operator machine is hoisting at a normal operating limit. When an acceleration (e.g., a negative acceleration or a deceleration) that is less than a threshold acceleration value or reverse factor (described below) is detected, a maximum allowable reverse torque for the one or more hoist motors 215 is increased. The reverse torque applied to the one or more hoist motors 215 can dissipate and/or absorb the kinetic energy created by impact loading and imparted to the one or more hoist motors 215, the hoist transmission, and the winch drum 80. By dissipating the kinetic energy of the hoist motor, the hoist transmission, and the winch drum, the damaging effects of impact loading can be minimized and the nominal loading on the machine can be increased.

At step 415, the controller 200 compares the detected acceleration rate of the hoist motor with a threshold reverse factor ("TRF"). The TRF can be a predetermined value retrieved from memory (e.g., the memory 255), can be dynamically determined by the processor 250 based on the information received from the other elements of the shovel 10, or can be manually set by an operator. TRF can be used to determine whether the dipper 70 has impacted a large object in the bank and whether the system should dissipate the kinetic energy of the one or more hoist motors 215 and hoist transmission. In some embodiments, the TRF is a threshold acceleration value associated with the acceleration of the hoist motor. If the acceleration rate of the hoist motor 82 is less than the TRF, the controller 200 determines that an impact situation exists (at step 420). At that point, the hoist motor has a large negative acceleration due to the applied load from the object. Further, due to the inertia in the hoist motor, an additional torque is created in the hoist motor and that additional torque adds impact load on the hoist motor and on the machine's structures. In addition, at this point, the controller 200 can also determine the hoist generating torque limit (e.g., in percentage) of the shovel 10.

Figure 6:
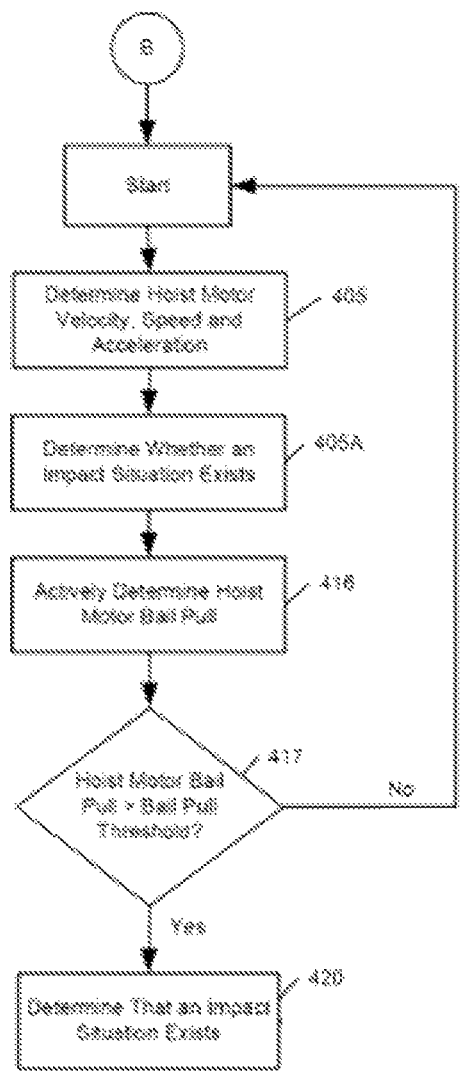

FIG. 6 illustrates a second technique for determining whether an impact situation exists. At step 416, the controller 200 actively (i.e., consistently) determines the hoist bail pull. In one embodiment, the hoist bail pull is determined using calculations with information about the detected acceleration and torque of the hoist motor 82. Next, the controller 200 determines whether the hoist motor bail pull is greater than a predetermined hoist motor bail pull threshold (at step 417). The hoist motor bail pull threshold can be a predetermined value retrieved from memory (e.g., the memory 255), can be dynamically determined by the processor 250 based on the information received from the elements of the shovel 10, or can be manually set by an operator. If the hoist motor bail pull is greater than a predetermined hoist motor bail pull threshold, the controller 200 determines that an impact situation exists (at step 420).

Figure 7:
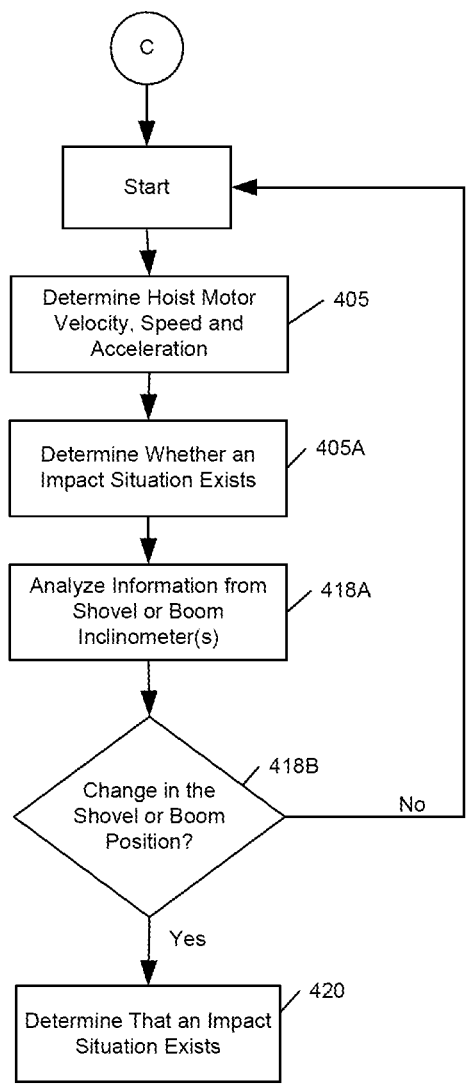

FIG. 7 illustrates a third technique for determining whether an impact situation exists. At step 418A, the controller 200 analyzes information (i.e., data) received from one or more inclinometers positioned on the body of the shovel 10 (e.g., on the machinery deck 30) or on the boom 35. The inclinometers provide information about the position of the shovel 10 and its elements. Based on the information from the inclinometers, the controller 200 determines whether there is a change in the position of the body of the shovel or the boom (at step 418B). In one embodiment, the controller 200 can determine whether the body of the shovel 10 is pitched forward at a certain level (i.e. at a certain degree). For example, if the shovel is generally digging at an incline of two degrees and hits a hard object while hoisting through the bank, the position of the shovel can change to zero or minus one degrees after the impact. The parameters associated with the position of the shovel 10 and its elements (e.g., the boom) can be predetermined and van be retrieved from memory (e.g., the memory 255), or can be manually set by an operator. If the controller 200 determines that there is change in the position of the shovel or its elements and that change corresponds to the defined position parameters, the controller determines that an impact situation exists (at step 420).

Figure 8:
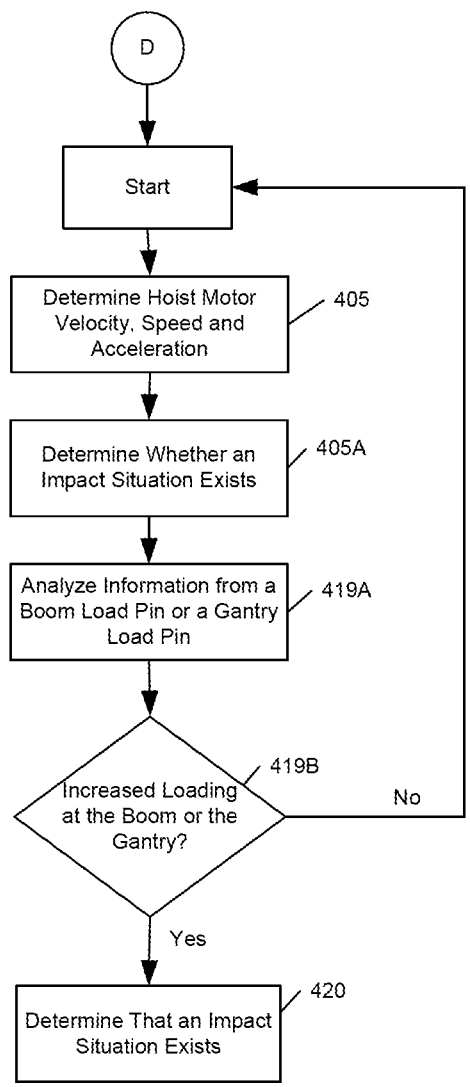

FIG. 8 illustrates a fourth technique for determining whether an impact situation exists. At step 419A, the controller 200 analyzes information (i.e., data) received from a boom load pin or a gantry load pin (not shown) positioned on the shovel 10. For example, one or more load sensors (not shown) positioned at the boom load pin and the gantry load pin transfer information regarding the load of the boom and the gantry. Based on the information from these load sensors, the controller 200 determines whether there is an increased loading at the boom and the gantry of the shovel (at step 419B). In one embodiment, the controller 200 compares the detected loading of the boom and the gantry with a loading value. The loading value can be predetermined based on previously detected data, can be retrieved from memory (e.g., the memory 255), or can be manually set by an operator. If the controller 200 determines that there is increased loading at the boom and the gantry, the controller determines that an impact situation exists (at step 420).

With continued reference to FIG. 4, in order to limit the impact loading on the machine, the controller 200 dynamically calculates a hoist ramp rate based on the comparison of the acceleration rate of the hoist motor to the TRF (at step 425). The hoist ramp rate is, for example, a set time during which the hoist the controller 200 or the motor drive 215 is to change the speed of the one or more hoist motors 82 from a current or present speed value to a new speed value. As such, the hoist ramp rate can affect the ability of the shovel 10 to limit the impact loading on the shovel. If the hoist ramp rate is not appropriate for allowing the controller 200 to achieve a desired change in speed, the shovel 10 is not able to properly remove the kinetic energy in the hoist motor 82. In some embodiments, the higher the hoist ramp rate the slower the speed responds to limit the impact loading on the shovel. As such, at step 425, the hoist ramp rate is set sufficiently to ensure that the shovel 10 is able to limit the impact loading. For example, the hoist ramp rate is set based on a hoist motor speed, a hoist motor torque, a hoist motor acceleration/deceleration, etc. In some embodiments, the hoist ramp rate is constant (e.g., linear). In other embodiments, the hoist ramp rate can dynamically vary with respect to, for example, time, motor speed, etc. In further embodiments, the hoist ramp rate can be a predetermined value retrieved from memory (e.g., the memory 255).

At step 428, the controller 200 sets a counter or another suitable timer. For example, the counter is set to monitor or control the amount of time that a new hoist reverse torque is set or applied (described below). In some embodiments, the counter is incremented for each clock cycle of the processing unit 250 until it reaches a predetermined or established value (e.g., the time value or period T). In other embodiments, the time value T is determined based upon the severity of the impact event. In other words, the stronger the impact, the longer the monitored time period.

In step 430, the controller 200 sends a reverse torque control command signal to the hoist motor 82, where the reverse command signal includes the previously calculated hoist ramp rate. By this command signal, the controller dynamically increases the maximum allowable hoist reverse torque (e.g., beyond a standard operational value). By doing this, the controller 200 limits the increase in the actual bail pull on the machine and reduces the hoist motor speed. For example, the hoist reverse torque is set to a value that exceeds a standard value or normal operating limit for the one or more hoist motors 215 reverse torque. In some embodiments, the reverse torque is set to approximately 150% of the standard operational limit for reverse torque. In other embodiments, the reverse torque is set to a value of between approximately 150% and approximately 100% of the standard operational limit for reverse torque. In still other embodiments, the reverse torque is set to greater than approximately 150% of the standard operation limit for reverse torque. In some embodiments, the controller 200 also sets a desired speed reference (e.g., a desired speed for the motor 82) at step 430.

Alternatively, at step 430, the controller 200 can send a remove torque control command signal to the hoist motor 82 instead of the reverse torque control command signal. The remove torque control command signal removes the torque of the hoist motor 82. Therefore, the shovel 10 will stop operating (i.e., driving) through the obstruction in the bank of material. Ultimately, this will reduce the stresses on the shovel 10.

In other embodiments, when the hoist ramp rate is determined, a speed reference is set. The speed reference is a desired future speed of the one or more hoist motors 215 that is selected or determined to dissipate the kinetic energy of the one or more hoist motors 215 and hoist transmission. When the speed reference is set, the hoist reverse torque of the hoist motor 82 is increased to dissipate the kinetic energy of the one or more hoist motors 215 and the hoist transmission. In some embodiments, the speed reference is set for the time value, T. In other embodiments, the speed reference can be dynamic and change throughout the time value, T (e.g., change linearly, change non-linearly, change exponentially, etc.).

At step 435, the counter is compared to the time value, T. If the counter is not equal to the time value, T, the counter is incremented (step 440), and the process 400 returns to step 435. If, at step 435 the counter is equal to the time value T, the hoist reverse torque is reset back to the standard value or within the normal operational limit of the motor and the speed reference is set equal to an operator's speed reference (e.g., based on a control device such as a joystick) (at step 445). After this, the process 400 returns to the beginning, where the controller 200 monitors for another impact loading situation.

In addition to monitoring the counter to determine the end of the DHIC process, the controller 200 can also monitor the hoist motor speed and the hoist motor torque. If the hoist motor speed is lower than a threshold (at step 431) and the hoist motor torque is lower than another threshold (at step 432), the controller 200 stops DHIC process and resets the operating parameters (at 445).

Thus, the invention provides, among other things, systems, methods, devices, and computer readable media for controlling a digging operation of an industrial machine based on an acceleration rate of a hoist motor. Various features and advantages of the invention are set forth in the following claims.

What is claimed is:
1. A method of controlling a digging operation of an industrial machine, the industrial machine including a dipper, a hoist rope attached to the dipper, a hoist motor moving the hoist rope and the dipper, and a computer having a controller, the method comprising:

monitoring a speed of the hoist motor;
 determining an acceleration rate of the hoist motor;
 comparing, by the controller, the acceleration rate of the hoist motor to a threshold reverse factor;
 determining, by the controller, an impact situation when the acceleration rate is less than the threshold reverse factor; and
 sending, from the controller, a reverse torque control command signal to the hoist motor, based on the acceleration rate being less than the threshold reverse factor;
 wherein the reverse torque control command signal includes a hoist ramp rate, the hoist ramp rate including a predetermined time period in which the speed of the hoist motor changes from a first speed to a second speed, the predetermined time period based on the comparison of the acceleration rate of the hoist motor to the threshold reverse factor.

2. The method of claim 1, further comprising dynamically determining the hoist ramp rate.

3. The method of claim 1, further comprising determining a torque and a speed of the hoist motor.

4. The method of claim 3, further comprising comparing the speed of the hoist motor with a predetermined hoist motor speed value.

5. The method of claim 1, wherein the threshold reverse factor is a threshold acceleration value associated with the acceleration of the hoist motor.

6. The method of claim 1, wherein the threshold reverse factor is a predetermined value retrieved from a memory.

7. The method of claim 1, wherein the threshold reverse factor is dynamically determined by the controller.

8. The method of claim 1, further comprising setting a counter to monitor an amount of time that the reverse torque control command signal is applied.

9. The method of claim 1, wherein the reverse torque control command signal increases a maximum allowable hoist reverse torque of the hoist motor.

10. The method of claim 9, wherein the maximum allowable hoist reverse torque is set to a value of approximately 150% of a standard operational limit for hoist reverse torque.

11. An industrial machine comprising:
 a dipper;
 a hoist rope attached to the dipper;
 a hoist motor operable to move the hoist rope and the dipper; and
 a controller connected to the hoist motor, the controller executing programmed instructions to:
  monitor a speed of the hoist motor,
  determine an acceleration rate of the hoist motor,
  compare the acceleration rate of the hoist motor to a threshold reverse factor,
  determine an impact situation when the acceleration rate is less than the threshold reverse factor, and
  send a reverse torque control command signal to the hoist motor, based on the acceleration rate being less than the threshold reverse factor;
 wherein the reverse torque control command signal includes a hoist ramp rate, the hoist ramp rate including a predetermined time period in which the speed of the hoist motor changes from a first speed to a second speed, the predetermined time period based on the comparison of the acceleration rate of the hoist motor to the threshold reverse factor.

12. The industrial machine of claim 11, wherein the controller is further configured to dynamically determine the hoist ramp rate.

13. The industrial machine of claim 11, wherein the controller is further configured to determine a torque and a speed of the hoist motor.

14. The industrial machine of claim 13, wherein the controller is further configured to compare the speed of the hoist motor with a predetermined hoist motor speed value.

15. The industrial machine of claim 11, wherein the threshold reverse factor is a threshold acceleration value associated with the acceleration of the hoist motor.

16. The industrial machine of claim 11, wherein the threshold reverse factor is a predetermined value retrieved from a memory.

17. The industrial machine of claim 11, wherein the threshold reverse factor is dynamically determined by the controller.

18. The industrial machine of claim 11, wherein the controller is further configured to set a counter to monitor an amount of time that the reverse torque control command signal is applied.

19. The industrial machine of claim 11, wherein the reverse torque control command signal increases a maximum allowable hoist reverse torque of the hoist motor.

20. The industrial machine of claim 19, wherein the maximum allowable hoist reverse torque is set to a value of approximately 150% of a standard operational limit for hoist reverse torque.

21. A method of controlling a digging operation of an industrial machine, the industrial machine including a dipper, a hoist rope attached to the dipper, a hoist motor moving the hoist rope and the dipper, and a computer having a controller, the method comprising:
 determining an acceleration rate and a torque of the hoist motor;
 determining, by the controller, a bail pull of the hoist motor using the acceleration rate and the torque of the hoist motor;
 comparing, by the controller, the hoist motor bail pull to a hoist motor bail pull threshold;
 determining, by the controller, an impact situation when the hoist motor bail pull is greater than the hoist motor bail pull threshold; and
 sending, from the controller, a reverse torque control command signal to the hoist motor, based on the hoist motor bail pull being greater than the hoist motor bail pull threshold;
 wherein the reverse torque control command signal includes a hoist ramp rate, the hoist ramp rate including a predetermined time period in which the speed of the hoist motor changes from a first speed to a second speed, the predetermined time period based on a comparison of the acceleration rate of the hoist motor to a threshold reverse factor.

22. The method of claim 21, further comprising sending, from the controller, a remove torque control command signal to the hoist motor.

23. A method of controlling a digging operation of an industrial machine, the industrial machine including a dipper, a drag rope attached to the dipper, a drag motor moving the drag rope and the dipper, and a computer having a controller, the method comprising
 monitoring a speed of the drag motor;
 determining an acceleration rate of the drag motor;
 comparing, by the controller, the acceleration rate of the drag motor to a threshold reverse factor;

determining, by the controller, an impact situation when the acceleration rate is less than the threshold reverse factor; and sending, from the controller, a reverse torque control command signal to the drag motor, based on the acceleration rate being less than the threshold reverse factor;

wherein the reverse torque control command signal includes a drag ramp rate, the drag ramp rate including a predetermined time period in which the speed of the drag motor changes from a first speed to a second speed, the predetermined time period based on the comparison of the acceleration rate of the drag motor to the threshold reverse factor.

\* \* \* \* \*